(12) United States Patent
Giuliani et al.

(10) Patent No.: US 10,414,232 B2
(45) Date of Patent: Sep. 17, 2019

(54) SUSPENSION FOR WHEELED VEHICLE

(71) Applicants: Federico Giuliani, Foligno (IT); Gabriele Bellani, Foligno (IT)

(72) Inventors: Federico Giuliani, Foligno (IT); Gabriele Bellani, Foligno (IT)

(73) Assignees: Riccardo Piergentili, Terni (IT); Fernando Giuliani, Foligno PG (IT)

( * ) Notice: Subject to any disclaimer, the term of this patent is extended or adjusted under 35 U.S.C. 154(b) by 0 days.

(21) Appl. No.: 15/301,974

(22) PCT Filed: Apr. 8, 2015

(86) PCT No.: PCT/IB2015/052553
§ 371 (c)(1),
(2) Date: Oct. 5, 2016

(87) PCT Pub. No.: WO2015/155712
PCT Pub. Date: Oct. 15, 2015

(65) Prior Publication Data
US 2017/0106710 A1   Apr. 20, 2017

(30) Foreign Application Priority Data
Apr. 8, 2014 (IT) .............................. PG2014A0022

(51) Int. Cl.
*B60G 11/58* (2006.01)
*B60G 15/06* (2006.01)
(Continued)

(52) U.S. Cl.
CPC .............. *B60G 11/58* (2013.01); *B60G 11/52* (2013.01); *B60G 13/10* (2013.01); *B60G 15/06* (2013.01);
(Continued)

(58) Field of Classification Search
CPC .... B60G 11/58; B60G 15/06; B60G 17/0272; B60G 17/0521; B60G 17/056;
(Continued)

(56) References Cited

U.S. PATENT DOCUMENTS

2003/0107161 A1*  6/2003  Teichmann .......... B60G 17/027
                                                                    267/64.11

FOREIGN PATENT DOCUMENTS

DE    102004032083 A1 *  1/2006
DE    102004032083 A1     1/2006
(Continued)

OTHER PUBLICATIONS

International Search Report and Written Opinion for International Application No. PCT/IB2015/052553 ( dated Jul. 17, 2015) (9 Pages).

*Primary Examiner* — Keith J Frisby
(74) *Attorney, Agent, or Firm* — Lucas & Mercanti, LLP

(57) ABSTRACT

Suspension for a wheeled vehicle provided with at least one wheel and a frame, having at least one elastic element functionally combinable between the wheel and frame is disclosed. The suspension has at least one hydro-pneumatic spring functionally combined in series with the elastic element so that the equivalent spring modulus (Keq) of the elastic element and hydro-pneumatic spring is variable as a function of the distance between the frame and wheel. The hydro-pneumatic spring is shaped and sized to behave also as an energy dissipator in series to the elastic element.

12 Claims, 2 Drawing Sheets

(51) Int. Cl.
*B60G 11/52* (2006.01)
*B60G 17/00* (2006.01)
*B60G 17/08* (2006.01)
*B60G 13/10* (2006.01)
*B60G 17/027* (2006.01)
*B60G 17/052* (2006.01)

(52) U.S. Cl.
CPC ....... *B60G 17/002* (2013.01); *B60G 17/0272* (2013.01); *B60G 17/0521* (2013.01); *B60G 17/08* (2013.01); *B60G 2202/12* (2013.01); *B60G 2202/152* (2013.01); *B60G 2202/242* (2013.01); *B60G 2202/32* (2013.01)

(58) Field of Classification Search
CPC .... B60G 17/002; B60G 17/027; B60G 13/10; B60G 2202/12; B60G 2202/152; B60G 2202/32; B60G 2202/242
USPC ............ 280/124.158, 124.159; 267/34
See application file for complete search history.

(56) References Cited

FOREIGN PATENT DOCUMENTS

| | | |
|---|---|---|
| EP | 2301773 A1 | 3/2011 |
| FR | 2260463 A1 | 9/1975 |
| JP | S59165287 A | 9/1984 |
| JP | S59165287 U | 11/1984 |
| JP | 2007-030660 A * | 2/2007 |
| JP | 2007030660 A | 2/2007 |
| WO | 2006012832 A1 | 2/2006 |

* cited by examiner

SUSPENSION FOR WHEELED VEHICLE

CROSS-REFERENCE TO RELATED APPLICATIONS

This application is a 371 of PCT/IB2015/052553 filed Apr. 8, 2015, which claims the benefit of Italian Patent Application No. PG2014A000022 filed Apr. 8, 2014.

FIELD OF THE INVENTION

The present invention relates to a suspension for wheeled vehicles. Specifically, the present invention is used in the automotive and motorcycle field.

KNOWN PREVIOUS ART

It is known that vehicle suspensions have to accomplish several functions, such as to isolating the vehicle from the loads transmitted from the ground, uniformly distributing the loads on the wheels, and maintaining the vehicle at a proper distance from the ground. In order to accomplish these tasks the suspension generally comprises an elastic element, usually a coil spring, that reacts with a strength proportional to its deformation, a damper, generally of the fluidic type, arranged in parallel to said spring that reacts with a force generally proportional to the moving speed of the suspension, and movement transmission devices.

Moreover, it is known that the elastic modulus of a coil spring univocally determines (for a given suspended mass and a given stroke or maximum available length) the following characteristics of movement transmission:
  the static deformation that determines the residual stroke of the suspension (weight/elastic modulus);
  the suspension's resonance frequency (elastic modulus/mass);
  the load capacity (elastic element*residual stroke)

Generally it is desirable to have a high load capacity (high elastic modulus, high residual stroke) and a high level of comfort (low resonance frequency, that is low elastic modulus). This introduces contrasting needs in the suspension design, thus requiring some compromises.

These compromises can be alleviated adopting several strategies such as: progressive springs, special geometry of the suspension with variable lever arms, preloaded spring. These solutions however can only partially compensate the above-mentioned compromise.

In regard to dampening, the fluidic damper—as already known—consisting of a cylinder and a sliding piston inside the cylinder, filled with oil, has a natural tendency to increase the load capacity proportionally to the speed of movement of the suspension which, combined to a parallel configuration, limits the insulation features of the suspension at high frequencies. Some suspensions of known previous art are described in the following documents: JPS59165287U, EP2301773, JPS59165287, JP2007030660 and DE102004032083.

Said suspensions usually comprise of a coil spring and a damper in parallel with the coil spring, that also determines the maximum stroke between the frame and the wheel of the vehicle. In some of said documents of known previous art there is also a gas spring, or even a hydro-pneumatic spring, that is a device comprising a first section containing a gas, and a second section containing oil and separated from the first section through a transfer piston between said first section and said second section during the movement of the frame in respect with the wheel of the vehicle. Said hydro-pneumatic spring, in the mentioned documents of known previous art—and depending on the type of suspension—either has the only task to change the ground clearance of the vehicle, or it has the task to vary the overall elastic modulus of the suspension, with the problem, however, of never making fluidically independent the damper in parallel with the coil spring from the hydro-pneumatic spring itself.

It is also known that using elastic elements such as air springs offer advantages compared to the coil spring, among which:
  high load capacity;
  adjustable and progressive elastic modulus;
  adjustable ride height;
  intrinsic damping capability of the air.

Difficulties in implementing gas elastic springs lie mainly in the fact that air suspensions typically require a considerable amount of space, the use of a compressor for the height adjustment, as well as particular precautions in order to manage the risk of loss of air. This is a consequence of the fact that an air spring has a natural preload force that cannot be eliminated and is due to the gas pressure that operates on a reference surface, and an elastic modulus that is monotonically increasing (decreasing) with the increase (decrease) of the stroke. It should be noted that by preload force, from here on, we will refer to the force required to win the resistance opposed by the spring (gas, coil, or of any other kind) to compress starting from a setting where it is not subject to external forces.

The object of this invention is to make a suspension that allows solving problems connected to the necessity to find a compromise between the need for a higher load capacity (low elastic modulus, high residual stroke) and a high level of comfort.

Moreover, object of this invention is also to make a suspension designed to be assembled with more flexibility compared to those of known previous art, and that can be also easily integrated in the geometry of existing suspensions.

Further object of this invention is therefore to make a suspension that is structurally simpler that those of known previous art.

Finally, it is the object of this invention to make a suspension comprising a hydro-pneumatic spring that guarantees a high level of safety also in the event of defects of said suspension or loss of gas from the hydro-pneumatic spring.

These and other purposes are achieved by this suspension for wheeled vehicle provided with at least one wheel and a frame, comprising at least one elastic element functionally combinable between said at least one wheel and said frame, characterized by comprising at least one hydro-pneumatic spring functionally combined in series with said at least one elastic element so that the equivalent spring modulus of said at least one elastic element and said at least one hydro-pneumatic spring is variable as a function of the distance between said frame and said wheel, said at least one hydro-pneumatic spring being shaped and sized to behave also as an energy dissipator in series to said at least one elastic element.

Therefore according to the invention, the suspension lacks the traditional fluidic damper placed in parallel with the coil spring, and is substituted by the hydro-pneumatic spring which is shaped and sized to behave as an energy dissipator, i.e. as damper, but in series (not in parallel anymore) to said at least one elastic element. The special shape of this invention allows a damping originated by three different physical phenomena independently controllable:

damping directly proportional to the moving speed of the suspension due to the oil flow caused by the movement of the hydro-pneumatic element;

damping inversely proportional to the speed of movement of the suspension as a function of the heat exchanged by the gas contained in the hydro-pneumatic element;

damping as a function of the inversion of the direction of the suspension's speed caused by mechanical friction due to the seals of the hydro-pneumatic spring.

Putting together these effects allows to dissipate a remarkable fraction of the kinetic energy collected by the elastic part, and to remove the need for a damper in parallel to said elastic element, or coil spring. It should be noted that by remarkable fraction it is meant a fraction of kinetic energy of between 5 and 60%, and preferably between 20% and 40% of the total collected in each cycle by the hydro-pneumatic spring.

This profitably allows decreasing the structural and planning complexity of the suspension, improving at the same time the insulation capacity of the suspension at high frequencies.

Moreover, according to the invention said at least one hydro-pneumatic spring is shaped so to have a preload force higher than that of said at least one elastic element.

In this setting the coil spring performs a double function: on one hand it absorbs the static weight of the vehicle thus determining the balance point of the suspension since the preload force of the hydro-pneumatic device is such to sustain a higher weight than the coil spring's preload force (possibly even null), on the other hand it serves as a limiting device for the elastic modulus of the progressive-coefficient hydro-pneumatic spring. Moreover, in the event of malfunctioning or loss of gas of the hydro-pneumatic element, the coil spring operates as a safety device and supports the weight of the vehicle.

In essence, the fact that the preload force of said at least one hydro-pneumatic spring is higher than the preload force of said at least one elastic element allows to decouple the static deformation of the suspension (that only depends on the static modulus of the coil spring, together with the weight of the suspended mass), from the adjustment of the elastic modulus, starting from the static load (that depends on the combination of hydro-pneumatic apparatus+coil spring). As a consequence of this, it is possible to release the static lowering of the vehicle from the resonance frequency—both independently adjustable—and at the same time obtain an elastic modulus that is progressive but still limited, with resulting reduced volumes of the gas chamber located inside the hydro-pneumatic device. Moreover, this solution offers the possibility to obtain a regressive modulus starting from the load corresponding to the gas preload.

Beside the above-mentioned advantages, the special assembly of said suspension also allows to adjust the height of the vehicle by changing the quantity of oil inserted in the hydro-pneumatic circuit.

In essence, according to the invention the suspension, which lacks the traditional fluidic damper placed in parallel with the coil spring, comprising an elastic element such as a coil spring, preferably with a high elastic modulus, but still constant or preset, functionally placed in series to a hydro-pneumatic spring, preferably with lower excursion in respect to the coil spring and still provided with an elastic modulus adjustable according to the load, as well as dependent on the volume and initial pressure of the gas contained in the hydro-pneumatic spring. Such pressure is regulated so that it develops a preload level higher than that of the coil spring. Below this preload level, the equivalent elastic modulus Keq corresponds to the elastic modulus of the coil spring k1. Above this preload value the hydro-pneumatic element allows a variation of the equivalent elastic modulus Keq in order to sum up—according to the law of the springs in series—the contribution of the coil spring to that of the hydro-pneumatic elastic element, whose elastic modulus k2 varies according to the position of the load to which it is exposed. Ultimately, for load values higher than the preload of the hydro-pneumatic apparatus, the global elastic modulus—or equivalent—Keq of the suspension is the result of the contribution of the coil spring and of the hydro-pneumatic spring, in mathematic terms it is $Keq=(k1*k2)/(k1+k2)$. The elastic modulus k2, represented by a curve that varies according to the load, depends on the initial volume (Vo) and pressure (Po), as well as on a reference surface inside the hydro-pneumatic apparatus. The latter represents an important design parameter as it determines the system's operative pressures and dimensions.

This suspension has the versatility of a suspension provided with only one air, or hydro-pneumatic, spring because by acting on the thermodynamic parameters (pressure, temperatures, and volume) of said hydro-pneumatic spring, it is possible to obtain an unlimited combination of load-transfer characteristic curves without substituting any part. In addition, besides the above-mentioned advantages, the suspension has a simple assembly and a high level of safety because in the event of loss of air from the gas spring, the vehicle would still be supported by the coil springs, therefore the suspension would perform like a traditional one.

Also according to the invention, said at least one hydro-pneumatic spring comprises at least one first chamber containing a gas, where said at least one first chamber is provided with at least one partition wall that is sliding, or deformable, within said at least one first chamber as a function of the position of said frame with respect to said at least one wheel, in order to adjust the volume, or the pressure of the gas inside said at least one first chamber.

Moreover, said hydro-pneumatic spring, which is functionally in series to the coil spring, comprises at least one second and one third chamber fluidically communicating with each other and containing an incompressible fluid; said at least one third chamber is provided with at least one first portion that is directly or indirectly combined with said at least one elastic element, and at least one second portion sealingly constrained movable with respect to said at least one first portion, in order to transfer said incompressible fluid between said at least one second chamber and said at least one third chamber and vice versa, according to the variation of the position between said frame and said at least one wheel. Furthermore, said at least one wall is also sliding or deformable as a function of the volume of incompressible fluid transferred from said at least one second chamber to said at least one third chamber, and vice versa.

According to the invention, said at least one first and said at least one second chamber are formed inside a tank and said at least one wall is sliding, or deformable, within said tank in order to define said at least one first chamber and said at least one second chamber.

Essentially this solution allows avoiding the making of a hydro-pneumatic spring whose seal against losses of gas is guaranteed by two portions that move toward each other in order to compress a gas.

More in detail, said at least one first portion and said at least one second portion of said at least one third chamber are coaxially arranged to said at least one elastic element. The third chamber is substantially annular-shaped and said at least one first portion comprises at least one first hollow sleeve and said at least one second portion comprises at least one second hollow sleeve shaped to sealingly slide with respect to said at least one first hollow sleeve. Besides, said at least one first portion has a region constrained to the wheel of the vehicle.

According to the invention, thus, said at least one elastic element has an end abutting against said at least one first portion of said at least one third chamber. Preferably, the stroke of the hydro-pneumatic spring is smaller than that of the coil elastic element.

According to an embodiment of the invention, said hydro-pneumatic spring comprises at least one duct for fluidically connecting said at least one second chamber to said at least one third chamber in order to transfer said incompressible fluid between said at least one second chamber and said at least one third chamber, and vice versa.

Furthermore, the hydro-pneumatic spring also comprises first means for adjusting the gas input/output to/from said at least one first chamber. Said first adjusting means comprise at least one valve, fluidically connected with said at least one first chamber, and a system for the air inflow/outflow to/from said at least one first chamber. This allows adjusting the hydro-pneumatic spring features either upon user's request or dynamically. Therefore, given a movement range for the damper, the characteristic curve of the hydro-pneumatic spring can be easily adjusted by changing the load pressure of said first chamber. Particularly, if the load pressure of said at least one first chamber lowers, the balance position will be achieved with a lower volume of said at least one first chamber than in case of a higher initial pressure, resulting in a suspension stiffening.

Furthermore, said hydro-pneumatic spring also comprises second means for adjusting the input/output of said incompressible fluid to/from said at least one second and third chamber. Said second adjusting means comprise at least one valve fluidically connected with said connecting duct, or said at least one second chamber or said at least one third chamber, and a second system for inflow/outflow of said incompressible fluid from/to said at least one connecting duct.

By way of an oil inlet valve, any portion of the volume got into said one first chamber, the one containing gas, may be introduced, so that it is possible to independently control the available stroke of the hydro-pneumatic spring and, thus, the ground clearance of the vehicle.

Moreover according to the invention, with the suspension an unlimited amount of force-displacement characteristic curves of the suspension can be obtained by adjusting the initial pressure and the volume of the oil introduced in the circuit, not only during the tuning but also dynamically without replacing any mechanical component. In this way, it is possible to obtain a very wide range of characteristic curves that allow to adapt a vehicle to any operating condition, either totally comfort-oriented or sport-oriented; on or off road. The suspension—subject of this invention— allows therefore to easily and reliably adjust the equivalent elastic modulus in function of the position between the frame and the wheel. Moreover, the suspension allows to independently adjust its force-displacement characteristic curve and the vehicle ground clearance without replacing any mechanical part, easily and reliably.

The suspension, which can be defined as a hybrid between a suspension provided with only a coil spring and a suspension provided with only a gas or hydro-pneumatic spring, allows to achieve a very wide range of characteristic curves, reproducing the progressiveness and versatility of a hydro-pneumatic suspension with the reliability of a coil spring suspension. Moreover this hybrid system can allow an active control of the suspension by way of one or more sensors, able to immediately control the suspension feature in order to dynamically obtain the change of air volume and/or pressure present inside said first chamber, or the volume of oil—or other similar liquid—present inside said at least one second and third chamber.

Also according to the invention, said hydro-pneumatic spring comprises as well means to vary the effects of the energetic dissipation of said at least one hydro-pneumatic spring. Particularly, said means of variation of the dissipative effects through said at least one hydro-pneumatic spring comprise at least one controlled heating element placed within said at least one first chamber. In this way, by controlling the temperature within said first chamber it is possible to adjust not only the pressure within the chamber, but also to instantly compensate the effects of the heat exchange of the gas with the exterior, thus regulating the damping capacity of the hydro-pneumatic spring.

Moreover, said means of variation of the dissipative effects comprise one or more further ducts with different geometry fluidically combined with said at least one duct, or with said at least one second chamber and said at least one third chamber, and vice versa, and one or more switching valves in order to operate in a controlled way the access of said incompressible fluid to said duct and/or to one or more further ducts, in order to modify the pressure drops of the incompressible fluid during the transfer of said incompressible fluid between said at least one second chamber and said at least one third chamber, and vice versa.

Finally, said suspension comprises a logical unit to retroactively control said means of variation of the dissipative effects of said at least one hydro-pneumatic spring.

BRIEF DESCRIPTION OF THE DRAWINGS

For purposes of illustrations and not limitative, more particular preferred embodiments of the present invention will be now provided with reference to the attached figures, in which.

DETAILED DESCRIPTION OF SOME EMBODIMENTS OF THE PRESENT INVENTION

Referring particularly to such figures, with numeral 1 is shown a suspension according to the invention.

Figure 1:
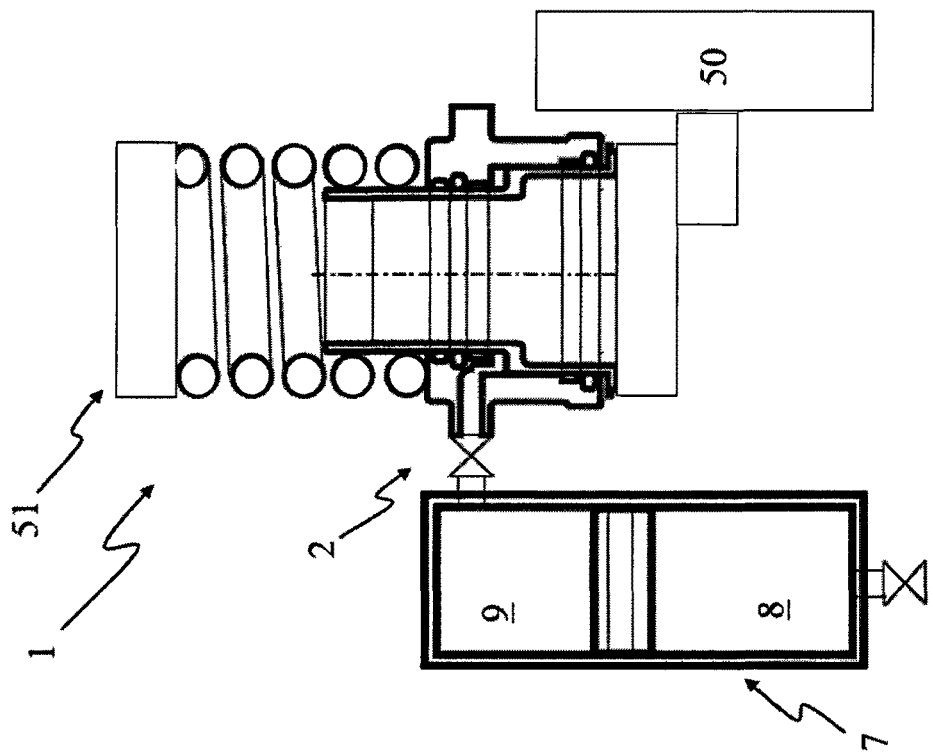
FIG. 1 is a schematic longitudinal section view of a suspension according to the invention, in a first position of the frame in respect with the wheel.

Referring to FIG. 1, the suspension 1 for a wheeled vehicle provided with at least one wheel 50 and a frame 51 (not shown here) such as for example a motorcycle, comprises an elastic element 5, such as a coil spring, with elastic modulus k1, coupleable between said wheel 50 and said frame 51 for the transmission of loads between said wheel 50 and said frame 51 according to the variation of the distance between frame 51 and wheel 50. It should be noted that such suspension is suitable for two-wheel vehicles as well as for three or four-wheelers. It is also important to point out that said suspension 1 lacks any damper placed in parallel with the elastic element 5, or coil spring, such as those described in the known previous art documents.

Furthermore, the suspension 1 comprises a hydro-pneumatic spring 7, with elastic modulus k2, functionally combined in series to the elastic element 5 and operating for at least part of the movement between the frame 51 and the wheel 50. Moreover, advantageously, said hydro-pneumatic spring 7 is productively shaped and sized to perform as well as energy dissipator in series to said at least one elastic element. Essentially, the hydro-pneumatic spring 7 is shaped and sized to operate also as a fluidic damper functionally arranged in series with the elastic element 5 and the hydro-pneumatic spring 7. It should be noted that the function of energy dissipator in series to the coil spring obtained through the hydro-pneumatic spring 7, unlike what a damper would do when acting in parallel on the whole suspension 1 stroke, does not determine, thus avoids, the worsening of the insulation capacity of the suspension at high frequencies. Note that in the hereby described embodiment, the hydro-pneumatic spring 7 is sized and shaped to dissipate kinetic energy of between 20 and 40% of the total accumulated in each cycle of the hydro-pneumatic spring 7.

This profitably thus allows to reduce the structural and planning complexity of the suspension, at the same time improving the insulation capacity of the suspension at high frequencies. An ever-existing problem when using the damper in parallel to the coil spring.

The hydro-pneumatic spring 7 so allows to vary the equivalent, or global, elastic modulus, Keq of the suspension 1, in order to add the contribution given by the inverse of the elastic modulus of the coil spring 5, that is 1/k1, to the contribution given by the inverse of the elastic module k2, given by the gas spring, whose value varies according to the position of the frame with respect to the position of the wheel. Ultimately, the global elastic modulus Keq of the suspension is given by the contribution of the coil spring 5 and of the hydro-pneumatic spring 7, mathematically derivable from the sum of the inverse of the constant elastic modulus k1 of the coil spring and the inverse of the variable elastic modulus k2 of the hydro-pneumatic spring, that is Keq=(k1\*k2)/(k1+k2). The elastic modulus k2, represented by a curve that changes based on the piston displacement with respect to the cylinder of the damper, also depends on the initial volume (Vo) and initial pressure (Po), as well as on a reference surface inside the hydro-pneumatic spring itself.

According to the invention the preload force of the gas spring 7 is higher than that of the elastic element 5.

In detail, still according to the embodiment hereby described, said hydro-pneumatic spring 7 comprises a first chamber 8 containing a gas, particularly air, and is provided with a partition wall 20 which is sliding within said first chamber 8 based on the position of the frame 51 with respect to the wheel 50 in order to change the volume and/or pressure of the gas within the first chamber 8. Preferably, the elastic element 5 has a high elastic modulus, in any case constant, whereas the air spring 7 operates through a stroke lower than the operating stroke of the elastic element 5 and has an elastic modulus K2 lower than that of the coil spring 5.

The embodiment described in the attached figures calls for a partition wall 20 sliding within the first chamber 8, nevertheless an embodiment wherein said partition wall 20 is deformable and comprises, for example, a diaphragm, still falls within the protection scope of the present invention.

Further, the damper in series 2 comprises a second 9 and a third 10 chamber fluidically communicating with each other through a duct 13 and containing an incompressible fluid, for example oil, so that the oil can be transferred from said second chamber 9 to the third chamber 10, and vice versa, when the position of the frame 51 relative to the wheel 50 changes.

More specifically, the third chamber 10 is provided with a first portion 11 directly or indirectly coupled to the elastic spring 5, and a second part 12 sealingly constrained movable with respect to said first portion 11 to transfer the oil between the second chamber 9 and the third chamber 10 and vice versa, whenever the position of the frame 51 relative to the wheel 50 changes. It should be noted that the second portion 12 is in turn indirectly coupled to the wheel 50 itself of the vehicle.

Figure 2:
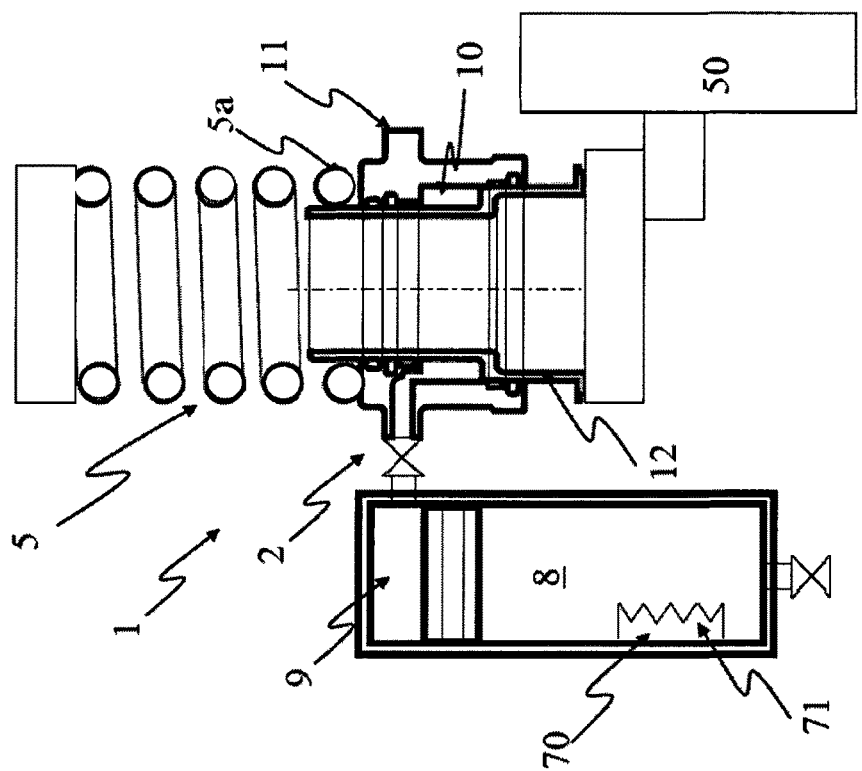
FIG. 2 is a schematic longitudinal section view of a suspension according to the invention, in a second position of the frame in respect with the wheel.
Figure 4:
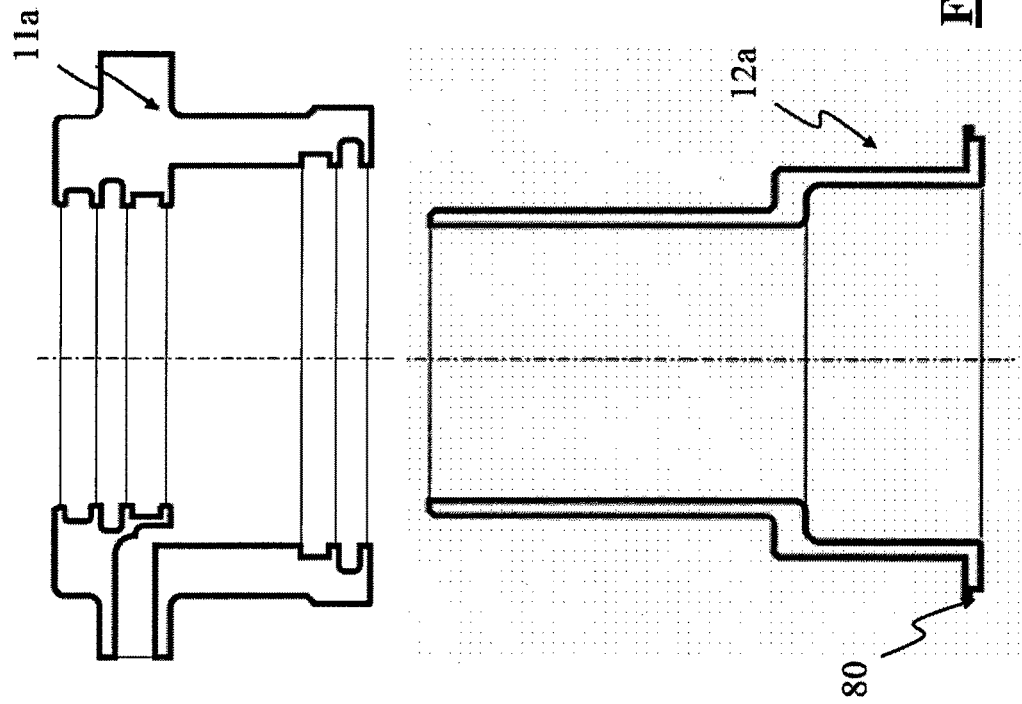
FIG. 4 is a schematic view of said at least one third chamber.
Figure 3:
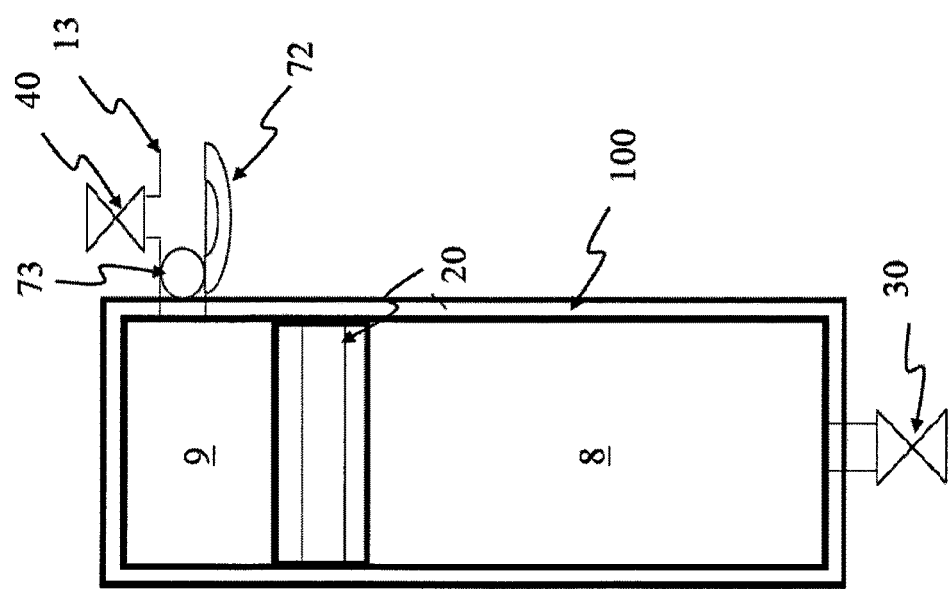
FIG. 3 is a longitudinal section view of said tank.

The partition wall 20 is sliding as well, based on the volume of the incompressible fluid transferred from said second chamber 9 to said third chamber 10, and vice versa. As shown in FIGS. 1 to 3, said first 8 and said second chambers 9 are formed inside a tank 100 and the wall 20 is sliding inside the tank 100 to define the first chamber 8 and the second chamber 9. Moreover, the first portion 11 and the second portion 12 of the third chamber 10 are arranged coaxially each other. In the embodiment shown herein, the third chamber 10 has a substantially annular shape in which the first portion 11 comprises a first hollow sleeve 11 a, coupled to the elastic element 5, and the second portion 12 comprises a second hollow sleeve 12a shaped to sealingly slide on the outside of said first hollow sleeve 11. Below, the second sleeve 12a comprises a region 80 that is indirectly coupled to the wheel 50.

The elastic element 5 has an end 5a abutting against said first portion 11 of said third chamber 10.

As shown in FIG. 3, said hydro-pneumatic spring 7 further comprises first means for adjusting the air input/output to/from said first chamber 8. Particularly, said first adjusting means comprise a valve 30 fluidically connected with said first chamber 8 and a system (herein not shown) for the inflow/outflow of gas, for example preferably air, from/to said at least one first chamber. This system for the gas inflow/outflow from/to said chamber, not shown herein, but nevertheless known to the field technician, comprises in a very simplified embodiment, a circuit housing a compressor operated by compressor adjusting elements. Thus, the circuit allows to introduce or extract air into/from said first chamber 8, venting air to the outside, depending on the demands of the designer and/or the user.

As a matter of fact, the control can take place either every time the vehicle set-up changes, or dynamically according to the presence of any sensors that automatically change the stiffness of the hydro-pneumatic spring 7 based on measurements of the chamber pressure or volume.

Moreover, said hydro-pneumatic spring 7 comprises second means for adjusting said incompressible fluid input/output to/from said second 9 and third chamber 10. Even in this case, said second adjusting means comprise at least a valve 40 fluidically connected with said connecting duct 13 and a second system for the inflow/outflow of said incompressible fluid from/to said at least one connecting duct. This system for the inflow/outflow of incompressible fluid from/to said at least one connecting duct 13, not shown here, is very well known to the field technician and comprises, in its simplified form, a closed circuit comprising at least one pump ad at least one pair of electro-valves that open or close the circuit depending on the designer's demands either during the initial set-up arrangement of the vehicle, or dynamically if the set-up changes upon user's request.

Therefore, this system allows to change the total stiffness of the hydro-pneumatic spring 7 as well as the ground clearance of the vehicle.

Furthermore, according to the invention, said hydro-pneumatic spring 7 comprises as well means 70 to vary the effect of energy dissipation of the hydro-pneumatic spring 7 itself. Particularly, said means of variation of the dissipative effects 70 comprise a controlled heating element 71, for example an electric resistance, placed inside said first chamber 8. In this way, by applying a controlled adjustment on the temperature within the first chamber 8, for example changing the current flowing along the resistance 71, it is possible to change not only the pressure inside the first chamber 8, but also the thermic-exchange modulus with the exterior, thus the damping capacity of the hydro-pneumatic spring.

Moreover, said means of variation of the dissipative effects 70, according to this embodiment, comprise a further duct 72 fluidically connected with the duct 13, and a commutation valve 73 to operate in a controlled way the incompressible fluid's flow through said duct 13 and/or through said further duct 72 in order to modify the loss of the load of the incompressible fluid during the transfer of said incompressible fluid between said at least one second chamber 9 and said third chamber 10, and vice versa. In this way, depending on the requirements, the damping capacity of the hydro-pneumatic spring 7 is either increased or decreased. As a matter of fact, according to the position of the stop-valve, (not shown herein but well known to the field technician) present in the commutation valve 73, the incompressible fluid will be allowed to flow only either through the duct 13 or through the further duct 72, or through both ducts 13 and 72. It is clear that the loss of load associated to these passage configurations vary due to the different geometries (diameter and ducts length) to which the fluid is subjected.

It should be noted that, albeit not described herein, an embodiment that considers the use of means of variation of the dissipative effects that comprise further ducts fluidically connected with the duct 13, or between said second chamber 9 and said third chamber 10, and vice versa, and one or more commutation valves 73 for the supervision of the access of said incompressible fluid to said duct 13 and/or to one or more of said further ducts 72, in order to modify the loss of load of the incompressible fluid during the transfer of said incompressible fluid between said second chamber 9 and said third chamber 10, and vice versa, still falls within the protection scope of this invention.

Finally, said suspension 7 comprises a logical unit (not shown herein) to retro-actively control said means of variation of the dissipative effects 70 of said hydro-pneumatic spring 7, according to necessity.

The invention claimed is:

1. Suspension for a wheeled vehicle provided with a wheel and a frame, comprising an elastic element functionally combinable between said wheel and said frame, said suspension comprising a hydro-pneumatic spring functionally combined in series with said elastic element so that the equivalent spring modulus (Keq) of said elastic element and said hydro-pneumatic spring is variable as a function of the distance between said frame and said wheel, said hydro-pneumatic spring being shaped and sized to behave also as an energy dissipator in series to said elastic element and to dissipate kinetic energy of between 20 and 40% of the total kinetic energy collected in each cycle by the hydro-pneumatic spring,
wherein said suspension lacks a fluidic damper arranged in parallel with said elastic element between said frame and said wheel and said hydro-pneumatic spring has a preload force greater than that of said elastic element.

2. Suspension according to claim 1, wherein said hydro-pneumatic spring comprises a first chamber containing a gas, said first chamber being provided with a partition wall which is sliding, or deformable, within said first chamber as a function of the position of said frame relative to said wheel, in order to change the volume, or pressure, of the gas inside said first chamber.

3. Suspension according to claim 2, wherein said hydro-pneumatic spring comprises a second and a third chamber fluidically communicating with each other and containing an incompressible fluid, said third chamber being provided with a first portion directly or indirectly combined with said elastic element, and a second portion sealingly constrained and movable with respect to said first portion to transfer said incompressible fluid between said second chamber and said third chamber, and vice versa, when the position of said frame relative to said wheel changes, said wall being slidable, or deformable, as a function of the incompressible fluid volume transferred from said second chamber to said third chamber, and vice versa.

4. Suspension according to claim 3, wherein said first and said second chamber are formed inside a tank and said wall is slidable, or deformable, inside said tank to define said first chamber and said second chamber.

5. Suspension according to claim 3, wherein said first portion and said second portion of said third chamber are arranged coaxially to said elastic element.

6. Suspension according to claim 5, wherein said first portion comprises a first hollow sleeve and said second portion comprises a second hollow sleeve shaped to sealingly slide with respect to said first hollow sleeve.

7. Suspension according to claim 3, wherein said third chamber has a substantially annular shape.

8. Suspension according to claim 3 wherein said hydro-pneumatic spring comprises a duct for fluidically connecting said second chamber with said third chamber to transfer said incompressible fluid between said second chamber and said third chamber, and vice versa.

9. Suspension according to claim 3, wherein said hydro-pneumatic spring further comprises means for varying the dissipative effects of said hydro-pneumatic spring.

10. Suspension according to claim 9, wherein said means for varying the dissipative effects of said hydro-pneumatic spring comprises a controlled-heating element that is arranged in said first chamber.

11. Suspension according to claim 9, wherein said means for varying the dissipative effects comprise one or more additional ducts fluidically combinable with a duct for fluidically connecting said second chamber with said third chamber, or between said second chamber and said third chamber, and vice versa, and one or more switching valves to operate, in a controlled way, the access of said incompressible fluid to said duct and/or to one or more of said one or more additional ducts, in order to modify the pressure drops of the incompressible fluid during the transfer of said incompressible fluid between said second chamber and said third chamber, and vice versa.

12. Method for the functioning of a suspension for a wheeled vehicle provided with a wheel and a frame, comprising an elastic element functionally combinable between said wheel and said frame, said suspension comprising a hydro-pneumatic spring functionally combined in series with said elastic element so that the equivalent spring modulus (Keq) of said elastic element and said hydro-pneumatic spring is variable as a function of the distance between said frame and said wheel, said hydro-pneumatic spring being shaped and sized to behave also as an energy dissipator in series to said elastic element and to dissipate kinetic energy of between 20 and 40% of the total kinetic energy collected in each cycle by the hydro-pneumatic spring, wherein said suspension lacks a fluidic damper arranged in parallel with said elastic element between said frame and said wheel, said method comprising the step of setting a preload force for said hydro-pneumatic spring greater than that of said elastic element.

* * * * *